US007895399B2

(12) United States Patent
Tomita et al.

(10) Patent No.: US 7,895,399 B2
(45) Date of Patent: Feb. 22, 2011

(54) COMPUTER SYSTEM AND CONTROL METHOD FOR CONTROLLING PROCESSOR EXECUTION OF A PREFETECH COMMAND

(75) Inventors: Aki Tomita, Tachikawa (JP); Naonobu Sukegawa, Inagi (JP)

(73) Assignee: Hitachi, Ltd., Tokyo (JP)

( * ) Notice: Subject to any disclaimer, the term of this patent is extended or adjusted under 35 U.S.C. 154(b) by 576 days.

(21) Appl. No.: 11/705,410

(22) Filed: Feb. 13, 2007

(65) Prior Publication Data

US 2008/0059715 A1 Mar. 6, 2008

(30) Foreign Application Priority Data

Aug. 29, 2006 (JP) ............................. 2006-232287

(51) Int. Cl.
*G06F 12/00* (2006.01)

(52) U.S. Cl. ................. 711/137; 711/130; 711/141; 711/204; 711/213; 712/207

(58) Field of Classification Search ....................... None
See application file for complete search history.

(56) References Cited

U.S. PATENT DOCUMENTS

| 7,039,766 B1 * | 5/2006 | Smith ................ 711/137 |
| 2005/0102477 A1 | 5/2005 | Sukegawa | |
| 2006/0004966 A1 * | 1/2006 | Maeda et al. ........... 711/137 |
| 2006/0020758 A1 * | 1/2006 | Wheeler et al. ......... 711/137 |
| 2006/0112229 A1 * | 5/2006 | Moat et al. ............ 711/137 |

FOREIGN PATENT DOCUMENTS

| JP | 2005-242527 | 2/2004 |
| JP | 2006-18474 | 6/2004 |

OTHER PUBLICATIONS

U.S. Appl. No. 11/357,972, Tomita et al.
U.S. Appl. No. 11/358,052, Aoki et al.

* cited by examiner

*Primary Examiner*—Kevin L Ellis
*Assistant Examiner*—Alan Otto
(74) *Attorney, Agent, or Firm*—Stites & Harbison, PLLC; Juan Carlos A. Marquez, Esq.

(57) ABSTRACT

A processor reads a program including a prefetch command and a load command and data from a main memory, and executes the program. The processor includes: a processor core that executes the program; a L2 cache that stores data on the main memory for each predetermined unit of data storage; and a prefetch unit that pre-reads the data into the L2 cache from the main memory on the basis of a request for prefetch from the processor core. The prefetch unit includes: a L2 cache management table including an area in which a storage state is held for each position in the unit of data storage of the L2 cache and an area in which a request for prefetch is reserved; and a prefetch control unit that instructs, the L2 cache to perform the request for prefetch reserved or the request for prefetch from the processor core.

12 Claims, 11 Drawing Sheets

131 L2 CACHE MANAGEMENT TABLE

| Index_Id | Line_No | MemAddr | LastMemAddr | ShareCnt | OnetimeFlag |
|---|---|---|---|---|---|
| 0 | 0 | 0x1000000 | 0x2000000 | 1 | Off |
|  | 1 | 0x1000100 | 0x2000000 | 3 | On |
|  | 2 | 0x1000200 | 0x2000000 | 3 | On |
|  | 3 | 0x1000300 | 0x2000000 | 1 | On |
|  | WAIT FOR PROCESSING | 0x1100000 | 0x3000000 | 1 | On |
|  | WAIT FOR PROCESSING | 0x1100100 | 0x3000000 | 3 | Off |
| 1 | 0 | 0x2000000 | 0x4000000 | 1 | Off |
|  | 1 |  |  |  |  |
|  | 2 |  |  |  |  |
|  | 3 |  |  |  |  |
|  | WAIT FOR PROCESSING |  |  |  |  |
|  | WAIT FOR PROCESSING |  |  |  |  |
| ... | ... | ... | ... |  |  |

*FIG. 4*

Register_Prefetch COMMAND

| INSTRUCTION CODE Register_Prefetch | MemAddr | OnetimeFlag (On/Off) | ShareCnt (>=1) | LastMemAddr |
|---|---|---|---|---|
| 1031 | 1032 | 1033 | 1034 | 1035 |

*FIG. 5*

Issue_Prefetch COMMAND

| INSTRUCTION CODE Issue_Prefetch | MEMORY ADDRESS | OnetimeFlag (On/Off) | ShareCnt (>=1) |
|---|---|---|---|
| 1321 | 1322 | 1323 | 1324 |

FIG. 7

Replace_Prefetch COMMAND

| INSTRUCTION CODE Replace_Prefetch | MEMORY ADDRESS | OnetimeFlag (On/Off) | ShareCnt (>=1) | ReplaceLine |
|---|---|---|---|---|
| 1321' | 1322 | 1323 | 1324 | 1325 |

FIG. 8

COMPUTER SYSTEM AND CONTROL METHOD FOR CONTROLLING PROCESSOR EXECUTION OF A PREFETECH COMMAND

CLAIM OF PRIORITY

The present application claims priority from Japanese application P2006-232287 filed on Aug. 29, 2006, the content of which is hereby incorporated by reference into this application.

BACKGROUND OF THE INVENTION

This invention relates to a cache control for a processor, and more particularly, to a processor that has a prefetch function for pre-reading data into a cache. This invention also relates to a prefetch function of a multi-core processor including a plurality of processor cores.

In recent years, it has become possible to integrate an enormous number of transistors due to finer elements accompanying advancement of a semiconductor manufacturing technique. Along with the advancement, a clock frequency of a processor (CPU) is increased and an arithmetic processing ability thereof is remarkably improved. On the other hand, in a main memory that stores data and programs, a transfer rate and a storage capacity of data have been improved due to finer semiconductors.

However, since the data transfer rate of the main memory is low compared with the improvement of the processing ability of the processor, a processor provided with a cache memory (hereinafter, referred to as cache) on a processor core side thereof is widely used. Since the cache operates at a speed equivalent to that of the processor, the cache can perform high-speed data transfer compared with the main memory. However, the cache has a small capacity compared with the main memory because of a die size and cost of the processor. On the other hand, since the main memory depends on an operation speed of a front side bus and a memory bus connected to the processor, a data transfer rate of the main memory is far lower than that of the cache. However, the main memory can have a large capacity.

In general, when the processor core of the processor reads data, first, if the processor core accesses the cache and hits data, the processor can read necessary data from the cache at a high speed. On the other hand, when the data is not present in the cache, since the processor core fails in reading the data from the cache (cache miss), the processor core reads necessary data from the main memory.

When a cache miss occurs, it takes a long time to read necessary data into the processor core of the processor from the main memory because the data transfer rate of the main memory is extremely low as described above. Therefore, in the processor core of the processor having high arithmetic processing ability, a pipeline of the processor core is stalled until the data arrives. As a result, the arithmetic processing speed falls. When the cache miss occurs, performance of the processor cannot be fully exerted because of the low data transfer rate of the main memory. Moreover, electric power is unnecessarily wasted.

Thus, in recent years, a processor having a prefetch function for reading necessary data in a cache in advance is widely known. By pre-reading data necessary for a command to be executed into the cache according to the prefetch function, a cache miss is prevented from occurring and processing ability of the processor is exerted.

As the prefetch function of the processor of this type, there is known a function in which a prefetch command is embedded in a program (execution code), and when a processor executes the prefetch command, data of an address designated by the prefetch command is pre-read into a cache. Alternatively, there is also known a processor that determines, from a state of access to a main memory by an execution code, an address in which data is to be pre-read and performs pre-reading using hardware (see, for example, JP 2006-18474 A). The latter processor that executes prefetch using hardware detects a stride with which access is made to addresses on the main memory at predetermined intervals, determines, on the basis of the intervals of the addresses, an address into which data is to be pre-read, and executes pre-reading corresponding to the intervals of the stride.

SUMMARY OF THE INVENTION

However, with the prefetch function as in the related art, pre-reading is not always successful to reduce cache misses. For example, if there is no space in a cache line when prefetch is executed, in a processor that does not perform the prefetch, it is impossible to pre-read necessary data into the cache. As a result, a cache miss occurs in a later command.

If there is no space in the cache line when prefetch is executed, in a processor that caches out data not used for a longest time according to LRU (Least Recently Used) and then performs pre-reading, there has been a case where data planned to be used in another command was cached out. In this case, it is possible to suppress generation of a cache miss for a program (or thread) command successfully prefetched. However, in the command planning to use the data that has been cached out, a cache miss occurs and an access to the main memory is performed.

In a processor that executes the prefetch command and has the prefetch function by hardware, data pre-read according to the prefetch command set in a program may be cached out by the prefetch function by the hardware. Thus, when the program is created, the prefetch command has to be inserted taking into account a behavior of the processor, so a great deal of labor and time is required.

Also, in recent years, a multi-core processor including a plurality of processor cores in one processor is gaining popularity. A multi-core processor in which a plurality of processor cores share a cache is also known. In the multi-core processor in which the cache is shared, since the plurality of processor cores use the shared cache, when a processor core caches out data according to the LRU system and performs prefetch when there is no space in a cache line, the other processor cores may fail in caching the data cached out.

As described above, in the related art, when there is no space in the cache line, even if prefetch is performed, it is impossible to reduce cache misses.

In the multi-core processor including the shared cache, since the respective cores execute a command independently, it is impossible for the plurality of processor cores to exert a high arithmetic processing ability unless data held in the shared cache is properly managed. In other words, when there is no space in the cache line of the shared cache, if a first processor core performs prefetch and caches out data according to the LRU system, data planned to be used by a second processor core may be cached out. As a result, the second processor core fails in reading the data with respect to the cache and loads the data from a main memory. Therefore, in the processor including the first processor core and the second processor core, even if prefetch is successful in one processor core, when a cache miss is caused in the other processor core, processing speed falls because of the cache miss.

In JP 2006-18474 A described above, with a stride having a certain degree of regularity in intervals of addresses, pre-reading may be successful. However, with a stride having irregular intervals of addresses or when discontinuous addresses are to be accessed, pre-reading may not be successful. In other words, even if a prefetch command is inserted when irregular accesses are known at a source code level, data pre-read by the prefetch command may be cached out according to the prefetch function by the hardware as described above. In this case, it is impossible to effectively use the prefetch command and the prefetch function.

Thus, this invention has been made in view of the above-mentioned problems and it is therefore an object of the invention to effectively execute prefetch according to a state of a cache line, and to realize prefetch suitable for a multi-core processor.

According to an aspect of this invention, there is provided a computer system, including: a main memory that stores: a program including one of a prefetch command and a load command; and data used in the program; and a processor that reads the program and the data from the main memory and executes the program, in which: the processor includes: a processor core that executes the program; a shared cache that stores the data on the main memory in a predetermined unit of data storage; and a prefetch unit that pre-reads the data into the shared cache from the main memory on the basis of a request for prefetch from the processor core; and the prefetch unit includes: shared cache management information including: an area in which a storage state is held for each position in the unit of data storage of the shared cache; and an area in which the request for prefetch is reserved; and a prefetch control unit that instructs the shared cache to perform one of the request for prefetch reserved and the request for prefetch from the processor core on the basis of the storage state of the shared cache.

According to the aspect of this invention, in the computer system: the processor core instructs, when the load command is executed, the shared cache control unit to read out an address included in the load command; and the shared cache control unit includes: a readout unit that transfers, when data of the address included in the load command is stored in the data storage area of the shared cache, the data to the processor core, and reduces the number of times corresponding to the data in the data storage area; and an updating unit that caches out the data in the data storage area when the number of times reaches a predetermined value.

Further, according to the aspect of this invention, in the computer system: the shared cache control unit notifies, when the updating unit performs the cache-out, the prefetch control unit of a position in a unit of data storage cached out; and the prefetch control unit updates shared cache management information corresponding to the position in the unit of data storage notified with the request for prefetch reserved, and instructs the shared cache control unit to perform the request for prefetch.

Therefore, according to the invention, if there is no space in the shared cache when a prefetch command is issued, it is possible to prevent data cached in the shared cache and required for later processing from being cached out and improve a hit ratio of the shared cache by reserving the prefetch command in shared cache management information.

Moreover, it is possible to promptly and accurately cache out unnecessary data and improve efficiency of use of the shared cache by setting in advance the number of times the processor core reads data to be read in the shared cache according to the prefetch command, reducing the number of times every time the processor core reads the data, and caching out the data when the number of times reaches a predetermined value.

BRIEF DESCRIPTION OF THE DRAWINGS

FIG. 4 is a diagram for explaining an example of a L2 cache management table managed by a prefetch unit.

FIG. 5 is a diagram for explaining an example of a format of a Request_Prefetch command issued to a prefetch control unit by a control unit.

FIG. 7 is a diagram for explaining an example of an Issue_Prefetch command issued to a L2 cache control unit by the prefetch control unit.

FIG. 8 is a diagram for explaining an example of a Replace command issued to the L2 cache control unit by the prefetch control unit.

DETAILED DESCRIPTION OF THE PREFERRED EMBODIMENTS

An embodiment of the invention will be hereinafter explained with reference to the accompanying drawings.

Figure 1:
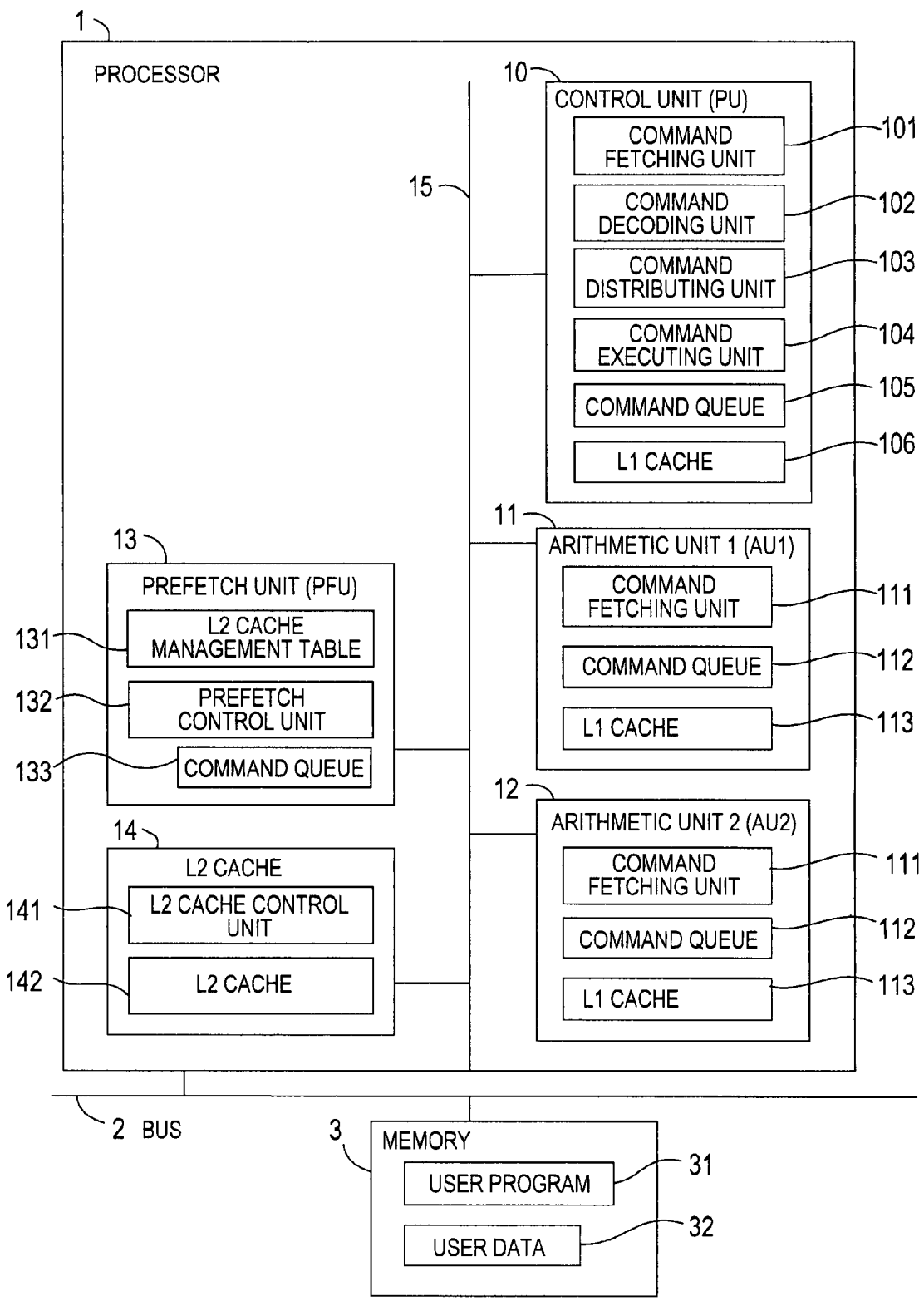
FIG. 1 is a block diagram of a computer system to which this invention is applied.

FIG. 1 is a block diagram of a computer system to which the invention is applied. The computer system mainly includes a multi-core processor 1 including a plurality of processor cores (control units or arithmetic units), a main memory (memory) 3 that stores user data 32 and a user program 31, and a bus 2 that connects the processor 1 and the memory 3. It is possible to connect a storage device and network interface (not shown) to the bus 2.

The processor 1 is an example of a heterogeneous multi-core processor system including different kinds of processor cores. The processor cores of the processor 1 include a control unit (PU) 10 serving as a control core that distributes a command to the respective processor cores and supervises arithmetic processing performed in the processor 1 and arithmetic units 11 and 12 serving as accelerator cores that execute the command distributed from the control unit 10. The arithmetic units 11 and 12 serving as the accelerator cores have the same structure. Although the two arithmetic units 11 and 12 are shown in FIG. 1, a larger number of arithmetic units may be provided.

The processor 1 further includes a secondary cache (an L2 cache) 14 that temporarily stores the user data 32 (hereinafter referred to simply as data) of the main memory 3 and a prefetch unit (PFU) 13 that controls prefetching of data of the main memory 3 into the secondary cache 14 when a prefetch command is received from the control unit 10. The secondary cache 14 functions as a shared cache which is shared by the respective processor cores.

The control unit 10, the plurality of arithmetic units 11 and 12, the secondary cache 14, and the prefetch unit 13 are connected to one another via a processor bus 15. The processor bus 15 is connected to the bus 2 via an interface (not shown). The processor 1 and the secondary cache 14 are accessible to the main memory 3.

<Control Unit>

A structure of the control unit 10 will be explained. The control unit 10 temporarily reads the user data 32 or the user program 31, which is stored in the main memory 3 or the secondary cache 14, into a level 1 cache (a L1 cache) 106 and allocates execution of a command to the plurality of arithmetic units 11 and 12. When the command to be executed is a prefetch command, the control unit 10 instructs the prefetch unit 13 to pre-read the user data 32 in an address designated by the prefetch command from the main memory 3 into the secondary cache 14. The control unit 10 themselves can execute the user program 31 as well. The L1 cache 106 functions as a local cache used by only the control unit 10.

In the control unit 10, a command fetching unit 101 acquires a command (an execution code) from the user program 31 read into the L1 cache 106. A command decoding unit 102 converts the command acquired by the command fetching unit 101 into an internal command (or a micro-operation) executable in the arithmetic units 11 and 12 (or the control unit 10 itself.

A command distributing unit 103 of the control unit 10 distributes the internal command converted by the command decoding unit 102 to the arithmetic units 11 and 12. Alternatively, in the case of an internal command (e.g., a prefetch command) executed by the control unit 10 themselves, the command distributing unit 103 inputs the internal command converted to a command queue 105.

When the internal command stored in the command queue 105 becomes executable, a command executing unit 104 starts execution of the internal command and reads data necessary for the execution of the internal command into the L1 cache 106 from the secondary cache 14 (or the main memory 3).

<Arithmetic Units>

The arithmetic units 11 and 12 (AU1 and AU2) will be explained. Since the arithmetic units 11 and 12 have the same structure, only the arithmetic unit 11 is explained and an explanation of the arithmetic unit 12 is omitted.

The arithmetic unit 11 includes a command executing unit 111 that controls execution of an internal command distributed from the control unit 10, a command queue 112 to which the internal command to be executed is inputted, and a level 1 cache (a local cache. hereinafter, referred to as L1 cache) 113 that functions as a local cache used by only the arithmetic unit 11.

The arithmetic unit 11 inputs the internal command distributed from the control unit 10 to the command queue 105. When the internal command inputted to the command queue 105 becomes executable, the command executing unit 111 starts execution of the internal command and reads data necessary for the execution of the internal command into the L1 cache 106 from the secondary cache 14 (or the main memory 3). When the execution of the internal command is completed, the command executing unit 111 writes back a result of an arithmetic operation to the L1 cache 113 or the secondary cache 14, finishes arithmetic processing of the internal command, and starts execution of the next internal command. In executing the internal command described above, the command executing unit 111 searches through the secondary cache 14 if the necessary data is not present in the L1 cache 113. When the necessary data is present in the L1 cache 113 or the secondary cache 14, the command executing unit 111 succeeds in reading the necessary data, which is called cache hit. When the necessary data is not present in the L1 cache 113 and the secondary cache 14, the command executing unit 111 fails in reading the necessary data, which is called cache miss. In the case of the cache miss, as described above, the command executing unit 111 comes into a stall state in which the command executing unit 111 cannot execute the internal command until the necessary data is read in the secondary cache 14 from the main memory 3.

<Structure of the Secondary Cache>

A structure of the secondary cache 14 that temporarily stores data of the main memory 3 will be explained.

The secondary cache 14 includes a secondary cache memory (hereinafter, referred to as L2 cache) 142 including a plurality of cache lines and a L2 cache control unit 141 that manages data of the L2 cache 142 in a unit of cache line.

The L2 cache control unit 141 refers to the L2 cache 142 on the basis of a load (reading) command from the control unit 10 or the arithmetic units 11 and 12 and, in the case of a cache hit, transfers a pertinent data to a processor core at a requesting source. On the other hand, when a cache miss occurs in the load command from the control unit 10 or the arithmetic units 11 and 12, as in the related art, the L2 cache control unit 141 reads data of a requested address from the main memory 3 and stores the data in the L2 cache 142.

On the other hand, in the writing of the data to the L2 cache 142, the data of the main memory 3 is written in a pertinent cache line on the basis of a command from the prefetch unit 13 that performs management in a unit of cache line of the cache memory 142 or a command from the control unit 10 or the arithmetic units 11 and 12.

Figure 2:
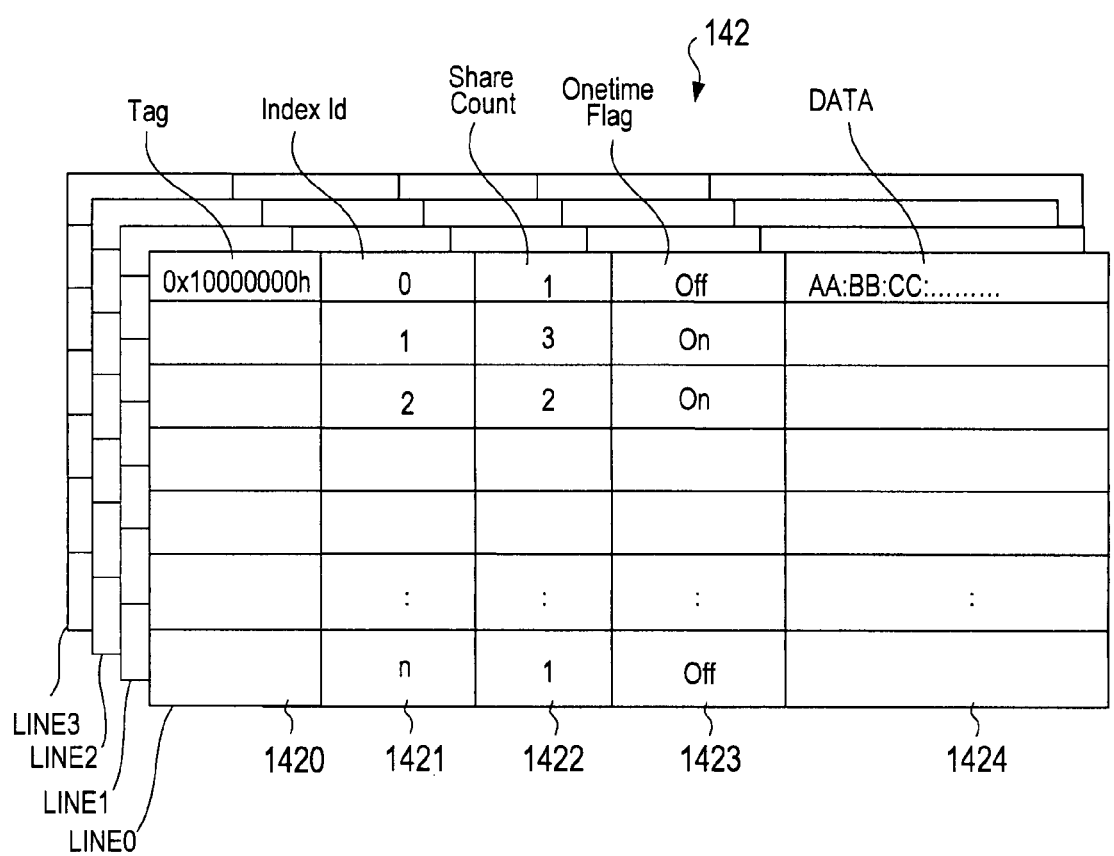
FIG. 2 is a block diagram showing a structure of a L2 cache.

An example of the L2 cache 142 according to the invention will be explained with reference to FIG. 2. FIG. 2 shows an example in which the cache memory 142 is constituted by a four-way cache associative cache. In this embodiment, the main memory 3 is managed in a unit of block (or page) of a predetermined number of bytes.

In FIG. 2, the L2 cache 142 is divided into four cache lines 0 to 3 (in the figure, LINES 0 to 3). Each of the cache lines is classified into index IDs 1421 of 0 to n. In the case of the four-way set associative cache, n=4. The index ID 1421 is an ID indicating a block of the main memory 3 and is represented by a less significant bit of a block address of the main memory 3. A significant bit of the block address of the main memory 3 is stored in a tag 1420. As a relation between the tag 1420 and the index ID 1421, a well-known method only has to be used.

For each of the index IDs 1421, data 1424 that temporarily stores a pertinent area (block) of the main memory 3, a share count 1422 indicating the number of processor cores that share the index ID 1421, and a onetime flag 1423 indicating whether the respective processor cores are referred to only a predetermined number of times (e.g., once) are set. An initial value of the share count 1422 is set to be equal to or larger than 1. The data 1424 stores data of a predetermined line size (number of bytes) for each of the 5, index IDs 1421 of each of the cache line numbers. The length of the data 1424 is a unit of data storage for reading/writing data with respect to the L2 cache 142. The index ID 1421 is an identifier indicating a position on the main memory 3 of the data 1424 using the tag 1420.

Values of the share count 1422 and the onetime flag 1423 are set in advance in the prefetch command of the user program 31. As described later, values included in the prefetch command transmitted from the prefetch unit 13 are stored as the values of the share count 1422 and the onetime flag 1423.

When the onetime flag 1423 is "On", this means that the respective cores refer to the data 1424 of the index ID 1421 once. When the onetime flag 1423 is "Off", this means that control is performed not based on the number of times the data 1424 of the index ID 1421 is referred to.

The share count 1422 indicates the number of times the data 1424 of the index ID 1421 is referred to when the onetime flag 1423 is "On". The L2 cache control unit 141 reduces the share count 1422 every time the data 1424 is referred to. When the onetime flag 1423 is "On" and the share counter 1422 is reduced to "0", this means that the reference is performed the number of times designated. In other words, it is assumed that the respective processor corers are referred to once. The data 1424 of the index ID 1421 with the onetime flag 1423 "On" and the share count 1422 "0" is not read next. Thus, the L2 cache control unit 141 can cache out the data 1424.

Besides the above, although not shown in the figure, a tag indicating a significant bit of an address and a flag indicating whether update is performed are set in the L2 cache 142. An ID of a processor core referred to may be stored in the L2 cache 142.

Figure 3:
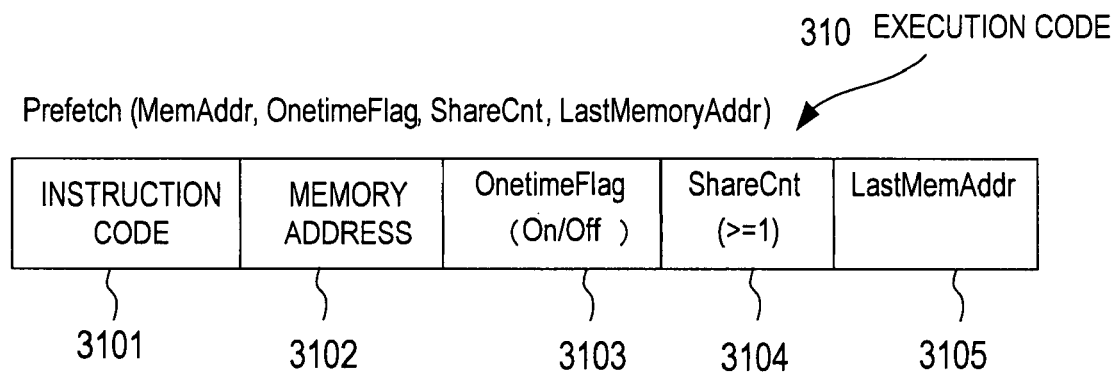
FIG. 3 is a diagram for explaining an example of a format of a prefetch command included in a user program.

An example of an execution code 310 of a prefetch command included in the user program 31 is shown in FIG. 3. In FIG. 3, the execution code 310 of the prefetch command includes a command code 3101 set in advance, a memory address 3102 of the main memory 3 referred to, a onetime flag 3103, a share count 3104 (an initial value is equal to or larger than 1), and a memory address maximum value (LastMemAddr) 3105 serving as an index for caching out the data 1424 stored in the index ID 1421 of the cache line shown in FIG. 2. The respective parameters (the onetime flag, the share count number, and the memory address) of the prefetch command are set by a complier. It is impossible to store all address areas of the main memory 3 indicated by the tag 1420 and the index ID 1421 in the data 1424 of each of the index IDs 1421. Therefore, when a memory address referred to with the index ID 1421 exceeds the memory address maximum value 3105 in a reference request from the respective processor cores, data in the index ID 1421 is cached out and a memory address area of the main memory 3 including the memory address referred to is loaded. In this case, the memory address maximum value 3105 indicates a memory address of the main memory 3 started to be read next.

As described later, when the control unit 10 executes the execution code 310 of the prefetch command, the control unit 10 transmits the prefetch command to the L2 cache control unit 141 via the prefetch unit 13. The L2 cache control unit 141 performs prefetch according to the prefetch command and sets a onetime flag, a share count number, and the like in the index ID 1421 corresponding to the prefetch.

<Structure of the Prefetch Unit>

The prefetch unit 13 includes a prefetch control unit 132 that manages a state of the L2 cache 142 and a prefetch request from the control unit 10. The prefetch control unit 132 manages a L2 cache management table 131 that manages a state of storage of the L2 cache 142 and a prefetch request from the control unit 10. The prefetch control unit 132 sends the prefetch request to the L2 cache control unit 141. The prefetch unit 13 further includes a command queue 133 that receives a prefetch command from the control unit 10.

When there is a change in the state of the L2 cache 142, the prefetch control unit 132 updates the L2 cache management table 131. When the prefetch control unit 132 receives a prefetch command from the control unit 10, the prefetch control unit 132 temporarily stores the command in the command queue 133. When the prefetch command of the command queue 133 becomes executable in the L2 cache management table 131, the prefetch control unit 132 instructs the second cache 14 to perform prefetch.

FIG. 4 shows an example of the L2 cache management table 131 managed by the prefetch control unit 132 of the prefetch unit 13. The L2 cache management table 131 has a line number 1312 corresponding to a cache line for each of index IDs 1311. In this embodiment, as shown in FIG. 2, the L2 cache 142 is constituted by the four-way set associative cache. Thus, the line number 1312 has, in addition to entries 0 to 3 corresponding to cache lines, an entry of "wait for processing" in which a prefetch command that cannot be executed is stored. The number of entries of "wait for processing" is determined as appropriate according to a size of the L2 cache 142 and the like. In the example in FIG. 4, two entries of "wait for processing" are provided for each of the index IDs 1311.

In the entries corresponding to the line number 1312, in order to store the memory address, the memory address maximum value, the share count, and the onetime flag shown in the execution code 310 of the prefetch command in FIG. 3, a memory address 1313, a memory address maximum value 1314, a share count 1315, and a onetime flag 1316 are set.

The entry of "wait for processing" is an entry for performing reservation of a prefetch command. When a cache line is free, a prefetch command of "wait for processing" is executed to store data in the L2 cache 142. When the prefetch command in the entry of "wait for processing" is executed, the respective fields from the memory address 1313 to the onetime flag 1316 are cleared.

In FIG. 4, for example, in an entry in which the index ID 1311 is 0 and the cache line is 1, data of address=0x1000100 is stored, the memory address maximum value 1314 is 0x2000000, the onetime flag 1316 is "On", and the share count 1315 is set to "3". This means that data of the entry is held in the L2 cache 142 until the three processor cores, i.e., the control unit 10 and the arithmetic units 11 and 12 refer to the data.

The prefetch control unit 132 reduces the share count 1315 every time an entry in which the onetime flag 1316 is "On" is accessed. When the onetime flag 1316 is "On" and the share count 1315 is reduced to "0", since the entry is not referred to any more, it is possible to cache out data in a cache line corresponding to the entry. As described above, an initial value of the share counter 1315 is set to be equal to or larger than 1.

<Operations of Prefetch>

Operations of the respective units at the time when a prefetch command is executed in the control unit 10 will be explained below.

When the control unit 10 executes a prefetch command included in the user program 31, the control unit 10 transmits a Register_Prefetch command shown in FIG. 5 to the prefetch unit 13. In FIG. 5, the Register_Prefetch command includes a command code 1031 set in advance, a memory address 1032 of the main memory 3 referred to, a onetime flag 1033, a share count 1034 (an initial value is equal to or larger than 1), and a memory address maximum value (LastMemAddr) 1035 serving as an index for caching out the data 1424 stored in the index ID 1421 of the cache line shown in FIG. 2. Although not shown in the figure, an ID indicating an order of a command issued may be added.

Figure 6:
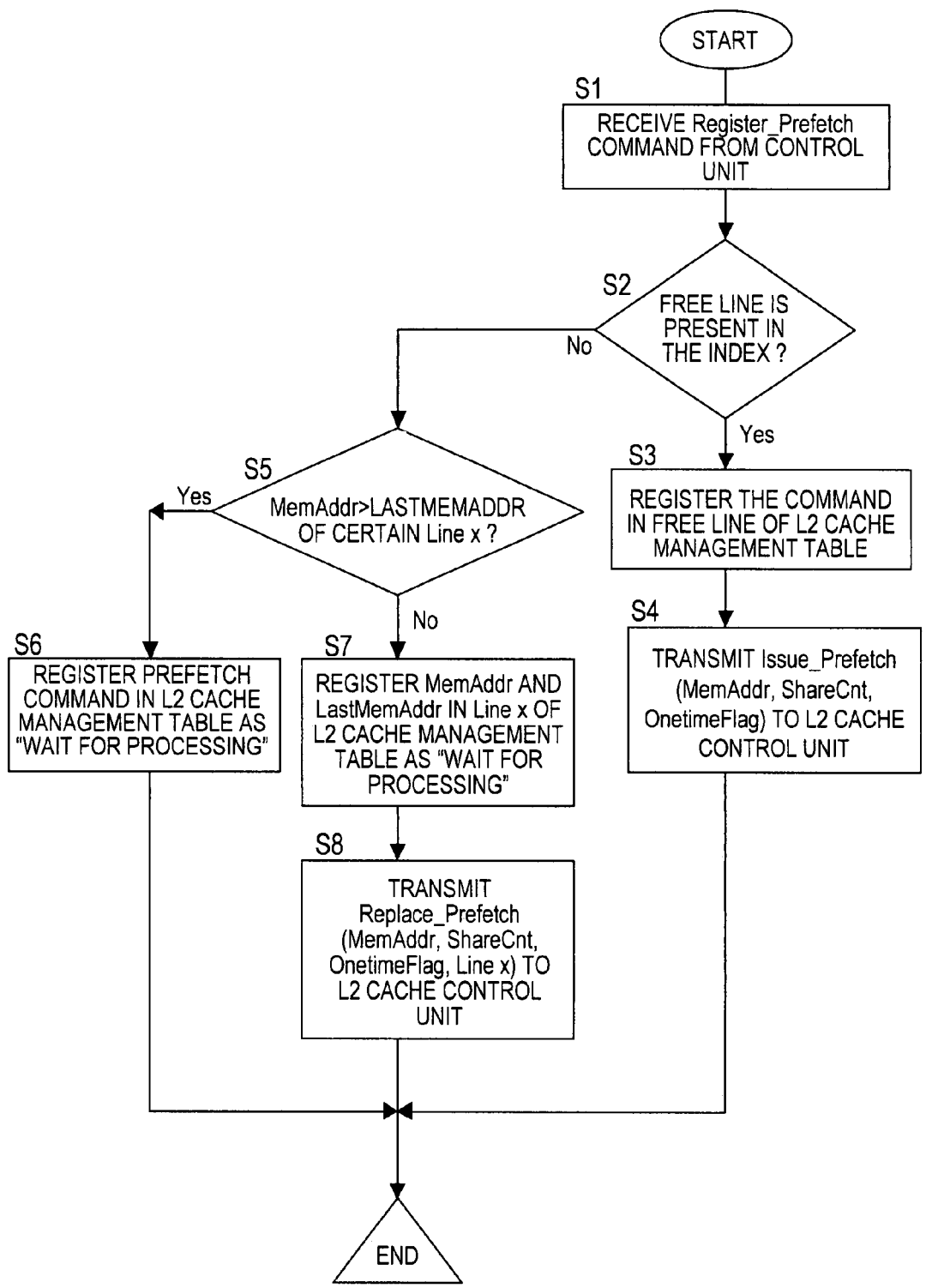
FIG. 6 is a flowchart showing an example of processing performed in the prefetch control unit of the prefetch unit, the processing being executed when the Request_Prefetch command is received from the control unit.

When the prefetch unit 13 receives the prefetch command (the Register_Prefetch command) from the control unit 10, the prefetch control unit 132 executes control shown in FIG. 6. FIG. 6 is a flowchart of processing executed by the prefetch control unit 132 every time the Register_Prefetch command is received.

First, in Step S1, the prefetch control unit 132 receives the Register_Prefetch command from the control unit 10. In Step S2, the prefetch control unit 132 determines the index ID 1311 corresponding to an address referred to by the Register_Prefetch command and judges whether there is a space in a cache line of the index ID 1311 with reference to the L2 cache management table 131. A relation between the address referred to and the index ID 1311 is determined according to the number of ways of the L2 cache 142. In this embodiment, since the L2 cache 142 is the four-way set associative cache, all blocks of the main memory 3 are divided into four, and values of less significant 2 bits of the address referred to and the respective index IDs 1311 are associated to find the index ID 1311 corresponding to the address referred to (the memory address 1032 in FIG. 5).

When there is a space in the index ID 1311 corresponding to the address referred to from the L2 cache management table 131, the fetch control unit 132 proceeds to processing in Step S3. When there is no space, the fetch control unit 132 proceeds to processing in Step S5.

In Step S3, the fetch control unit 132 writes a content of the fetch command received in a cache line that is free in the index ID 1311 of the L2 cache management table 131. In other words, the fetch control unit 132 writes a value of the memory address 1032 in FIG. 5 in the memory address 1313 of the L2 cache management table 131 and writes the onetime flag 1033, the share count 1034, and the memory address maximum value 1035 in FIG. 5 in the one time flag 1316, the share count 1315, and the memory maximum value 1314 of the L2 cache management table 131.

In Step S4, the prefetch control unit 132 issues an Issue_Prefetch command to the L2 cache control unit 141 and finishes the processing. The Issue_Prefetch command includes, as shown in FIG. 7, a command code 1321 indicating the Issue_Prefetch command, a memory address 1322, a onetime flag 1323, and a share count 1324. A value extracted from the Register_Prefetch command received from the control unit 10 by the prefetch control unit 132 is set in the Issue_Prefetch command.

The L2 cache control unit 141 receives the Issue_Prefetch command. Since there is a space in the cache line, as described later, the L2 cache control unit 141 directly executes the prefetch command.

On the other hand, when there is no space of the cache line in the index ID 1311, in Step S5, the prefetch control unit 132 compares a value of the memory address 1032 referred to by the Register_Prefetch command and the memory address maximum values 1314 of the respective cache lines 0 to 3 of the index ID 1311 to find a cache line in which a value of the memory address 1032 of the Register_Prefetch command is larger than the memory address maximum value 1314.

When a value of the memory address 1032 referred to is larger than the memory address maximum values 1314 of the respective cache lines 0 to 3 of the index ID 1311 of the L2 cache management table 131, the prefetch control unit 132 proceeds to Step S6. In Step S6, since there is no data of the memory address 1032 referred to in the cache lines 0 to 3 of the index ID 131 and the cache line 0 to 3 are not free, the prefetch control unit 132 registers the prefetch command in the index ID 1311 of the L2 cache management table 131 as "wait for processing". In this registration, the prefetch control unit 132 sets the memory address 1032, the onetime flag 1033, the share count 1034, and the memory address maximum value 1035 of the Register_Prefetch command in the memory address 1313, the onetime flag 1316, the share count 1315, and the memory address maximum value 1314 of the L2 cache management table 131, respectively.

If there are the cache lines 0 to 3 in which the memory address maximum value 1314 is equal to or smaller than a value of the memory address 1032 referred to in the index ID 1311 of the memory address 1032 referred to, the prefetch control unit 132 proceeds to Step S7.

In Step S7, for the cache line in which the value of the memory address 1032 referred to is equal to or smaller than the memory address maximum value 1314, the prefetch control unit 132 updates the onetime flag 1033 and the share count 1034 of the content of the Register_Prefetch command. In this case, since the memory address 1032 designated by the Register_Prefetch command is already cached in the cache memory 142, the prefetch control unit 132 updates only conditions for load (the onetime flag and the share count).

In Step S8, the prefetch control unit 132 transmits a Replace_Prefetch command shown in FIG. 8 to the L2 cache control unit 141. The Register_Prefetch command is obtained by adding a cache line number 1325 to the Issue_Prefetch command in FIG. 7 and setting a value of the Replace_Prefetch command in a command code 1321'. The L2 cache control unit 141 receives the Replace_Prefetch command and updates, for a cache line corresponding to the Register_Prefetch command of the L2 cache 142, the share count 1422 and the one-tine flag 1423 with the value of the Replace_Prefetch command.

As described above, when the prefetch control unit 132 receives the Register_Prefetch command from the control unit 10, if there is a free cache line in the index ID 1311, the prefetch control unit 132 sets the cache line of the index ID 1311 of the L2 cache management table 131 in a content of the Register_Prefetch command and transmits the Issue_Prefetch command to the L2 cache control unit 141.

On the other hand, when there is no free cache line, the prefetch control unit 132 registers the prefetch command as "wait for processing" according to a result of comparison of the memory address maximum values 1314 of the respective cache lines of the index ID 1311 and a value of the memory address 1032 referred to.

When the value of the memory address 1032 referred to is larger than the memory address maximum values 1314 of the respective cache lines 0 to 3, since the memory address 1032 referred to is not cached in the secondary memory 142, the prefetch control unit 132 registers the prefetch command in the L2 cache management table 131 as "wait for processing".

On the other hand, when the value of the memory address 1032 referred to is equal to or smaller than the memory address maximum values 1314 of the respective cache lines 0 to 3, since the memory address 1032 referred to is included in the cache lines, the prefetch control unit 132 instructs the L2 cache control unit 141 to update the share count and the onetime flag. The prefetch control unit 132 updates the content of the L2 cache management table 131.

Processing by the L2 cache control unit 141 at the time when the Issue_Prefetch command is received from the prefetch unit 13 will be explained with reference to a flowchart in FIG. 9. This processing is executed every time the Issue_Prefetch command is received from the prefetch unit 13.

In Step S11, the L2 cache control unit 141 receives the Issue_Prefetch command. In Step S12, the L2 cache control unit 141 reads data of the memory address 1322 of the Issue_Prefetch command from the main memory 3 in a unit of block. The L2 cache control unit 141 determines a cache line of the index ID 1421 of the L2 cache 142 corresponding to the memory address 1032 and writes the data read from the main memory 3 in the data 1424 of the cache line.

In Step S13, the L2 cache control unit 141 writes the onetime flag 1323 and the share count 1324 designated by the Issue_Prefetch command in the onetime flag 1423 and the share count 1422 of the L2 cache 142. The L2 cache control unit 141 updates the tag 1420 of the cache line of the index ID 1421 of the L2 cache 142 on the basis of a value of the memory address 1322 of the Issue_Prefetch command.

According to the processing described above, it is possible to pre-read new data into a cache line that has a space.

Figure 10:
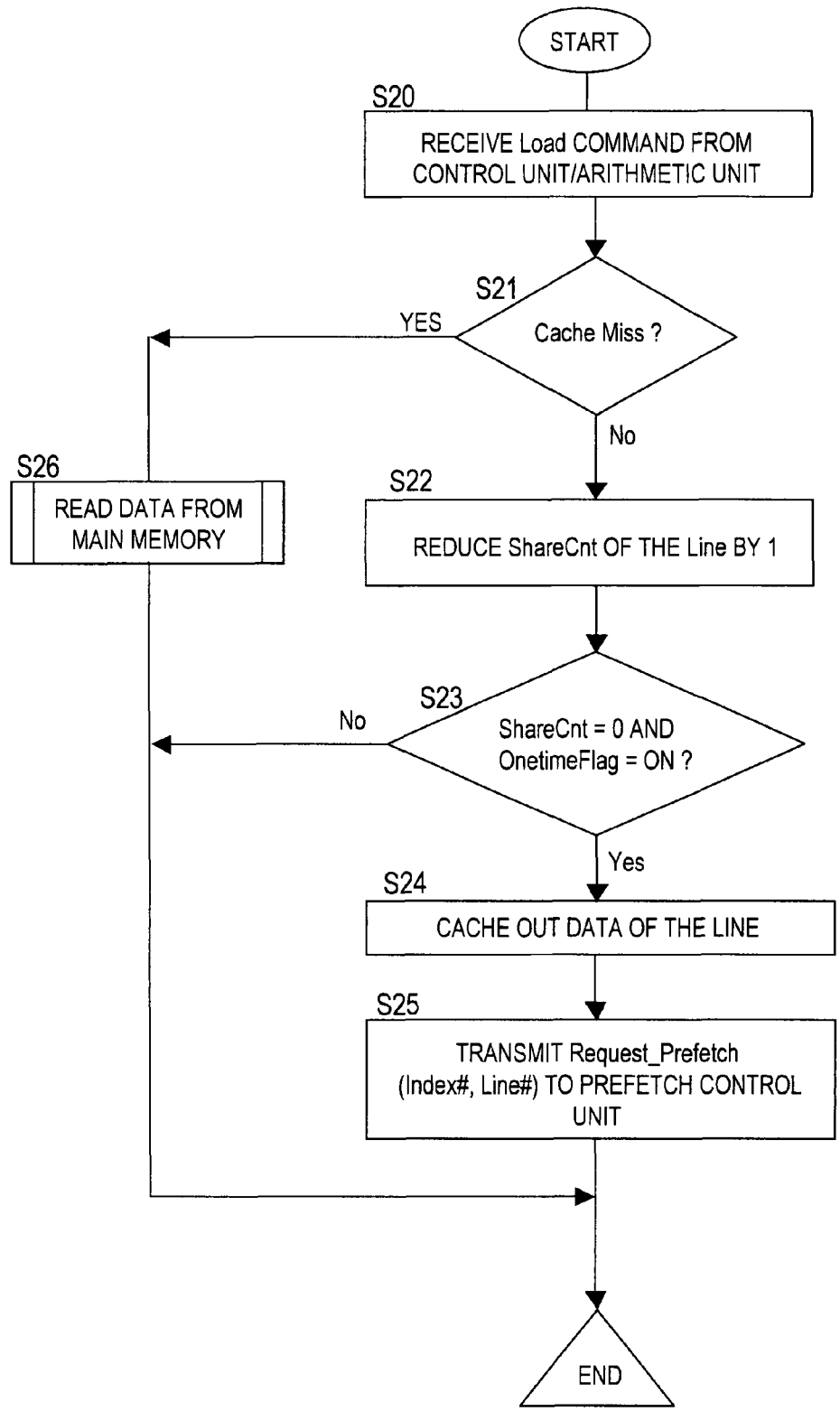
FIG. 10 is a flowchart showing an example of processing performed in the L2 cache control unit, the processing being executed when a load command is received from a processor core.

Processing by the L2 cache control unit 141 at the time when a load command is issued from a processor core of the control unit 10 or the arithmetic units 11 and 12 to the secondary cache 14 will be explained below with reference to FIG. 10. FIG. 10 is a flowchart showing an example of processing executed by the L2 cache control unit 141 when a load command is received from each of the processor cores.

In Step S20, the L2 cache control unit 141 receives a load command from any one of the processor cores of the control unit 10 or the arithmetic units 11 and 12.

In Step S21, the L2 cache control unit 141 judges whether data of an address designated by the load command received is present in the L2 cache 142. When the data of the address requested is present in the L2 cache 142 (cache hit), the L2 cache control unit 141 proceeds to processing in Step S22. When the data of the address requested is not present in the L2 cache 142 (cache miss), the L2 cache control unit 141 proceeds to processing in Step S26.

In the case of the cache hit, in Step S22, the L2 cache control unit 141 reduces "1" from the share count 1422 of the index ID 1421 of the cache line (LINEs 0 to 3 in FIG. 2) corresponding to the data. In this case, the L2 cache control unit 141 returns the cache data 1424 of the index ID 1421 to an issuance source of the load command. The issuance source of the load command continues the processing using the data 1424 present in the L2 cache 142.

In Step S23, the L2 cache control unit 141 judges whether the share count 1422 of the index ID 1421 is "0" and the onetime flag 1423 of the index ID 1421 is "On". When the share count 1422 of the index ID 1421 is "o" and the one time flag 1423 of the index ID 1421 is "On", since a command for referring to the cache data 1424 of the index ID 1421 is not present at the present point, the conditions for cache-out are satisfied. When the conditions for cache-out are satisfied, the L2 cache control unit 141 proceeds to Step S24. When the conditions for cache-out are not satisfied, the L2 cache control unit 141 finishes the processing.

In Step S24, the L2 cache control unit 141 caches out the data 1424 of the index ID 1421. In processing for the cache-out, if the data 1424 is updated, the L2 cache control unit 141 writes back the data 1424 to an address corresponding to the data of the main memory 3. The L2 cache control unit 141 clears the data 1424, the share count 1422, and the onetime flag 1423 of the index ID 1421 from the cache memory 142.

In Step S25, the L2 cache control unit 141 notifies the prefetch control unit 132 of the number (0 to 3) of the cache line cached out and the index ID 1421 as a Request_Prefetch command.

Figure 11:
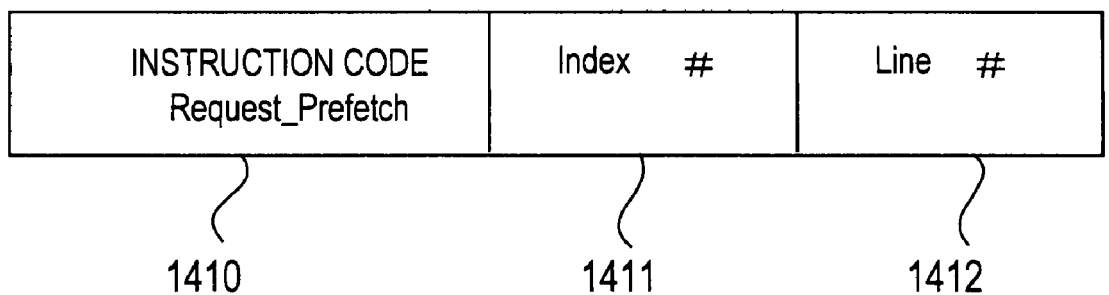
FIG. 11 is a diagram for explaining an example of a format of a Request_Prefetch command issued to the prefetch control unit by the L2 cache control unit.

The Request_Prefetch command includes, as shown in FIG. 11, a code 1410 of the Request_Prefetch command for notifying the prefetch control unit 132 that there is a space in a cache line, a cache line number 1412 of the cache line, and an index ID 1411.

When a cache miss occurs in Step S21, the L2 cache control unit 141 proceeds to Step S26 and reads data of the address designated by the load command in the cache memory 142 from the main memory 3. When there is no space in the cache line in which the data read in the cache memory 142 is stored, the L2 cache control unit 141 carries out cache-out and stores the data not read in the L2 cache 142 according to a publicly known method such as the LRU system or the round robin as in the related art. In this case, the L2 cache control unit 141 notifies the prefetch control unit 132 of a number of the cache line in which the data is cached and an index ID thereof. The prefetch control unit 132 receives this notification and updates an entry of the L2 cache management table 131 corresponding to the index ID and the cache line number received. In the case of a cache miss, since it is impossible to set the share count 1315 and the onetime flag 1316, the secondary cache line unit 141 sets the onetime flag 1316 to "Off" and sets a predetermined initial value (e.g., "1") in the share count 1315.

According to the processing described above, the L2 cache control unit 141 can carry out cache-out for an entry in which the onetime flag 1423 is "On" and the share count 1422 is "0" of the data 1424 present in the cache memory 142 because the entry is not planned to be referred to at the present point. The L2 cache control unit 141 can notify, with a Request_Prefetch command, the prefetch control unit 132 that there is a space in the cache line.

Figure 12:
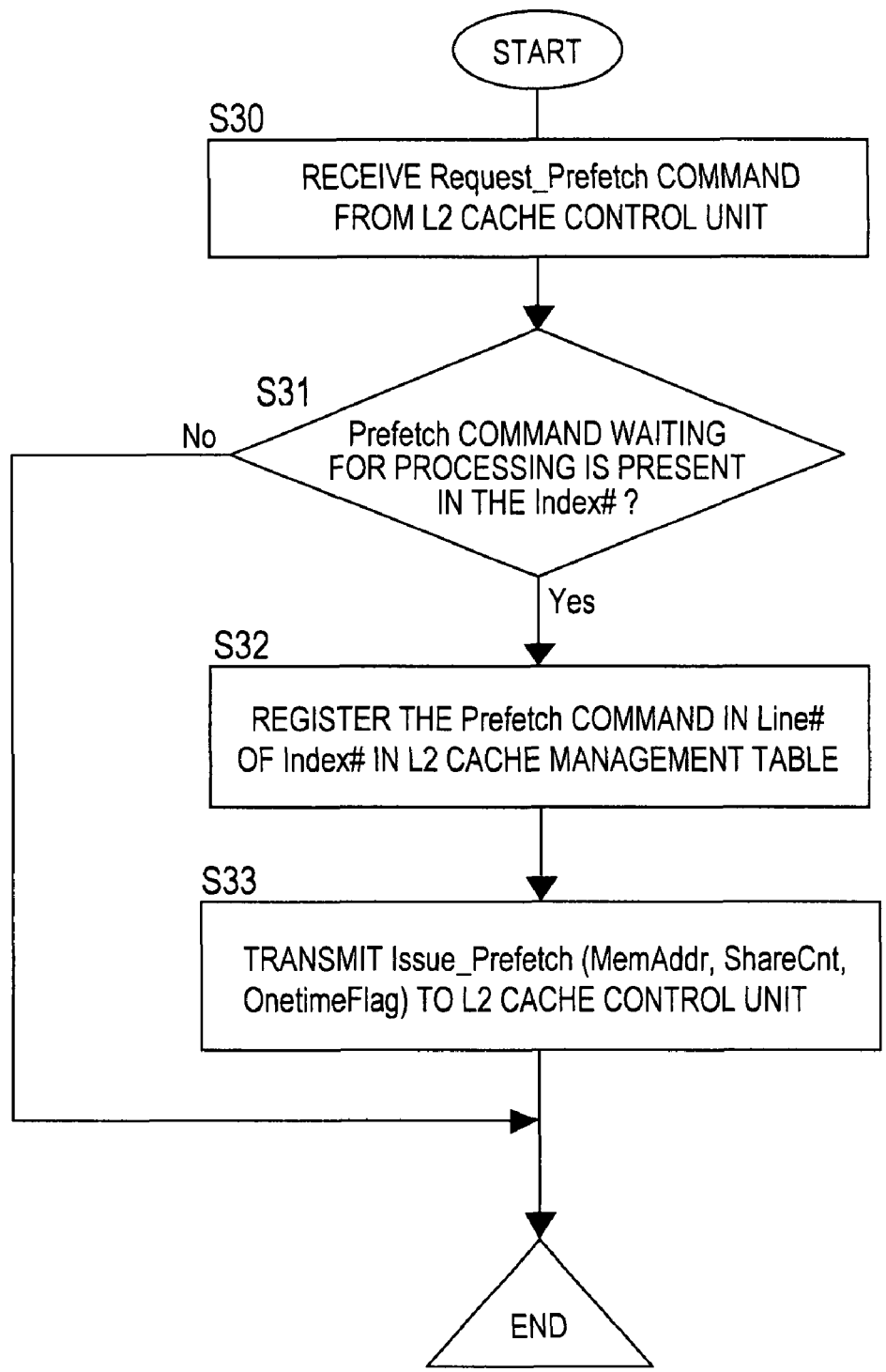
FIG. 12 is a flowchart showing an example of processing performed in the prefetch control unit, the processing being executed when the Request_Prefetch command is received from the L2 cache control unit.

Processing by the prefetch control unit 132 at the time when the Request_Prefetch command is received from the L2 cache control unit 141 will be explained below with reference to FIG. 12. FIG. 12 is a flowchart showing an example of the processing executed by the prefetch control unit 132 when the Request_Prefetch command is received.

In Step S30, the prefetch control unit 132 of the prefetch unit 13 receives the Request_Prefetch command from the L2 cache control unit 141. The prefetch control unit 132 acquires the cache line number 1412 of a cache line in which there is a space and the index ID 1411 thereof from the Request_Prefetch command.

In Step S31, the prefetch control unit 132 refers to the L2 cache management table 131 shown in FIG. 4 and judges whether there is a prefetch command registered as "wait for processing" in the index ID 1411 acquired.

When there is a prefetch command reserved in "wait for processing", the prefetch control unit 132 proceeds to Step S32. When there is no prefetch command reserved in "wait for processing", the prefetch control unit 132 finishes the processing.

In Step S32, the prefetch control unit 132 registers the memory address 1313, the memory address maximum value 1314, the share count 1315, and the onetime flag 1316 set in the prefetch command of "wait for processing" in an entry with the index ID 1311 and the line number 1312 of the L2 cache management table 131 corresponding to the cache line number and the index ID acquired from the Request_Prefetch command.

In Step S33, the prefetch control unit 132 generates the Issue_Prefetch command shown in FIG. 7 with the contents of the memory address 1313, the share count 1315, and the onetime flag 1316 registered in the cache line number and the index ID of the Request_Prefetch command from "wait for processing" and transmits the Issue_Prefetch command to the L2 cache control unit 141.

Figure 9:
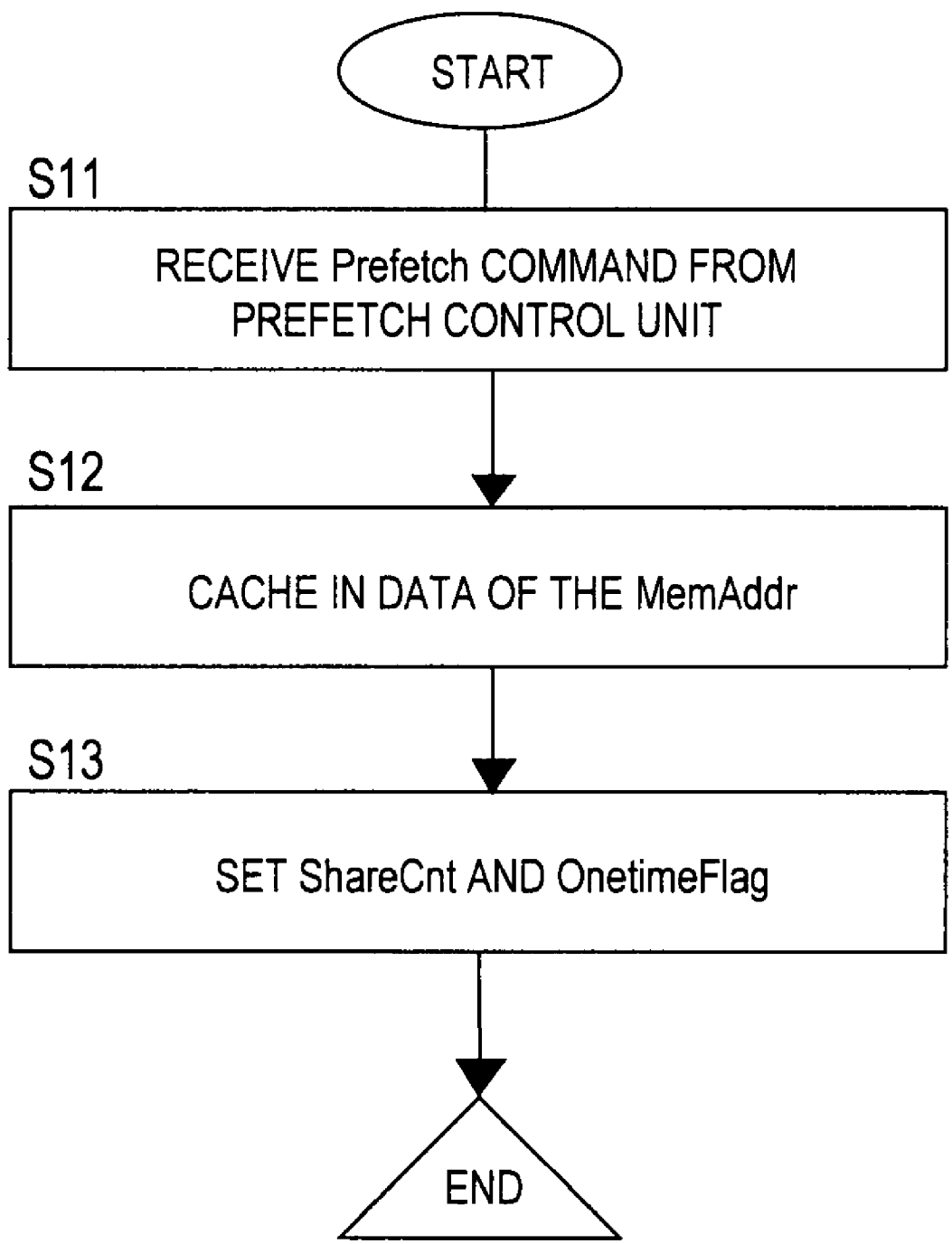
FIG. 9 is a flowchart showing an example of processing performed in the L2 cache control unit, the processing being executed when the pre-fetch command is received from the prefetch control unit.

The L2 cache control unit 141 receives the Issue_Prefetch command, executes the processing in FIG. 9, reads the data of the designated address in the index ID 1421 of the cache line made free by cache-out from the main memory 3, and completes the pre-read.

As described above, when the prefetch unit 13 receives the prefetch command from the control unit 10, the prefetch unit 13 refers to the L2 cache management table 131. When there is no space in an index ID of a cache line of an address requested to be prefetched, the prefetch unit 13 inputs a request for prefetch to an entry waiting for processing and reserves the prefetch command.

The L2 cache control unit 141 reduces the share count 1422 of the cache memory 142 every time a load command is received from the processor cores. When the share count 1422 is reduced to a "0" and the onetime flag 1423 is "On", the L2 cache control unit 141 caches out the data 1424 of the index ID 1421 of the cache line. The L2 cache control unit 141 notifies the prefetch control unit 132 that a space is formed in the cache line by the cache-out (Request_Prefetch command).

The prefetch control unit 132 receives the Request_Prefetch command, refers to the L2 cache management table 131 corresponding to an index ID of the L2 cache 142 that has a space, and searches for a prefetch command reserved in the entry of "wait for processing". When there is a prefetch command reserved as "wait for processing" in the index ID 1311 of the L2 cache management table 131, the prefetch control unit 132 issues the prefetch command of "wait for processing" to the L2 cache control unit 141 as the Issue_Prefetch command. Consequently, in the L2 cache 142, the new data 1424 is pre-read into the cache line having a space.

The prefetch control unit 132 moves the content of "wait for processing", for which the Issue_Prefetch command is issued, to the line number 1312, for which the prefetch command is issued, in the L2 cache management table 131.

In this way, when the prefetch command is received from the control unit 10, if there is no space in a cache line, the cache line is reserved as "wait for processing". Consequently, as in the related art, it is possible to prevent data cached in the L2 cache 142 from being cached out.

The L2 cache control unit 141 sets the number of times the respective processor cores read data as the share count 1422 and sets the onetime flag 1423 "On" for data for which it is possible to control cache-out with the share count 1422. The share count 1422 is reduced every time a load command is received from the respective processor cores to cache out cache data for which the share count 1422 is "0" and the onetime flag 1423 is "On". This makes it possible to cache out only unnecessary cache data.

Thereafter, the prefetch command reserved in the entry of "wait for processing" in the L2 cache management table 131 of the prefetch control unit 132 is executed. This makes it possible to surely cache in necessary data while preventing the necessary data from being cached out from the L2 cache 142.

The number of times one processor core reads data is set in attributes of data, which is prefetched in the L2 cache 142, from the prefetch command as the share count 1422. A flag that validates the share count 1422 is set from the prefetch command as the onetime flag 1423. This makes it possible to immediately cache out data after the respective processor cores read the data a necessary number of times. This makes it possible to prevent unnecessary data from being continuously held in the L2 cache 142.

In embedding the prefetch command in the user program 31, a share count and a onetime flag are designated at a compiler or source level. When the user program 31 is executed, the prefetch control unit 132 and the L2 cache control unit 141 of the processor 1 can control cache-out and cache-in using the share count and the onetime flag. Consequently, in creating the user program 31, unlike the related art, it is unnecessary to take into account a behavior of the processor when the prefetch command is inserted. This makes it possible to substantially reduce labor and time required for creation of the user program 31.

The share count 1422 is set as a sum of the numbers of times of the processor cores of the processor 1 read data, i.e., the number of processor cores sharing one cache data. Thus, for example, when the processor 1 including a plurality of processor cores performs processing in parallel, it is possible to improve a hit ratio of data cached in once and improve processing speed of processor cores in a multi-core processor.

In this invention, unlike the related art, it is possible to prevent data, which the processor cores intend to read, from being cached out by the prefetch function provided by hardware. This makes it possible to effectively use a prefetch command for accesses with discontinuous strides or addresses and improve speed of arithmetic processing.

In the example explained in this embodiment, the processor 1 is constituted by the heterogeneous multi-core processor. However, the invention may be applied to a homogeneous multi-core processor.

In the example explained in this embodiment, the control unit 10 and the prefetch unit 13 are independent from each other. However, although not shown in the figures, the prefetch unit 13 may be arranged in the control unit 10.

In the example explained in this embodiment, the prefetch unit 13 controls the secondary cache 14. However, the prefetch unit 13 may control a tertiary cache.

In the example explained In this embodiment, the L2 cache control unit 141 pre-reads data from the main memory 3 and writes back cached-out data in the main memory 3. However, the L2 cache control unit 141 may read data from and write back data in a storage device (not shown), another computer, or a memory shared with another computer.

As described above, it is possible to apply the invention to a processor that executes a prefetch command. In particular, it is possible to apply the invention to a multi-core processor including a plurality of processor cores in one processor.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
a main memory that stores: a program including one of a prefetch command and a load command; and data used in the program; and
a processor that reads the program and the data from the main memory and executes the program, wherein:
the processor includes:
a plurality of processor cores that execute the program;
a shared cache that stores the data on the main memory in predetermined units of data storage; and
a prefetch unit that pre-reads the data into the shared cache from the main memory on the basis of a request for prefetch from a first processor core of the processor cores;

the prefetch unit includes:
shared cache management information including: a first area in which a respective storage state is held for each predetermined unit of data storage of the shared cache; and a second area for reserving the request for prefetch; and
a prefetch control unit that instructs the shared cache to perform one of reserving the request for prefetch and executing the request for prefetch from the first processor core on the basis of the respective storage states held for the predetermined units in the shared cache,
the prefetch command includes a first address of data on the main memory and a number indicating a quantity of two or more of the processor cores that share the data of the first address on the main memory;
the shared cache includes:
a data storage area in which the data on the main memory and the number of processor cores are stored for each of the predetermined units of data storage that correspond to the first address; and
a shared cache control unit that reads the data from the first address on the main memory and stores the data of the first address on the main memory into the predetermined units of data storage that correspond to the first address based on the request for prefetch sent from the prefetch control unit;
one of the processor cores instructs, upon the load command being executed, the shared cache control unit to read out an address included in the load command;
the shared cache control unit stores the number of processor cores indicated by the request for prefetch in the data storage area in association with the data read from the first address on the main memory; and
the shared cache control unit includes:
a readout unit that, when data of the address included in the load command is stored in the data storage area of the shared cache, transfers the data of the address included in the load command to the instructing processor core and reduces the number of processor cores that share the data of the first address in the data storage area; and
an updating unit that caches out the data of the first address on the data storage area when the number of processor cores that share the data reaches a predetermined value.

2. The computer system according to claim 1, wherein the prefetch control unit reserves, upon the request for prefetch being received from the first processor core, the request for prefetch in the second area of the shared cache management information if there is no space in the first area of each predetermined unit of data storage of the shared cache management information, and instructs the shared cache to perform the request for prefetch if there is a space in the first area of each predetermined unit of data storage of the shared cache management information.

3. The computer system according to claim 1, wherein:
the shared cache control unit notifies, upon the updating unit performing the cache-out, the prefetch control unit of the predetermined units of data storage cached out; and
the prefetch control unit updates the shared cache management information corresponding to the predetermined units of data storage notified with the request for prefetch reserved, and instructs the shared cache control unit to perform the request for prefetch.

4. The computer system according to claim 1, wherein the number is a quantity of processor cores that read the data in one of the first arithmetic unit and the second arithmetic unit.

5. The computer system according to claim 1, wherein:
the prefetch command includes: a flag for permitting the number of processor cores to share the data;
the shared cache control unit stores the flag included in the request for prefetch instructed by the prefetch control unit in the data storage area in association with the data read; and
the readout unit reduces, upon the flag being a predetermined value, the number of processor cores corresponding to the data in the data storage area.

6. The computer system according to claim 1, wherein:
the prefetch command includes: a second address at an end on the main memory in a predetermined unit of data storage that is read upon storage of the data in the data storage area of the shared cache;
the shared cache management information stores the first address and the second address for each predetermined unit of data storage of the shared cache; and
the prefetch control unit instructs, upon the request for prefetch being received from the first processor core, the shared cache control unit to update the number of processor cores corresponding to the predetermined units of data storage corresponding to the first address with a number indicating a quantity of processor cores included in the request for prefetch if there is no space in the first area of each predetermined unit of data storage of the shared cache management information and if the second address at the end of the shared cache management information is larger than the first address.

7. A control method for controlling a processor that includes a main memory, a shared cache that stores the data on the main memory in predetermined units of data storage and a plurality of processor cores that read and execute a program including one of a prefetch command and a load command and data, the control method comprising the steps of
executing, by a first processor core of the plurality of processor cores, the prefetch command to instruct a prefetch unit of the processor to perform a request for prefetch, the prefetch command including a first address of data on the main memory and a number indicating a quantity of two or more of the processor cores that share the data of the first address on the main memory;
referring, by the prefetch unit, from shared cache management information including a first area in which a respective storage state is held for each predetermined unit of data storage of the shared cache and a second area for reserving the request for prefetch, to the respective storage states for the predetermined units of data storage corresponding to the request for prefetch from the first processor core;
judging, by the prefetch unit, on the basis of the respective storage states held for the predetermined units in the shared cache corresponding to the request for prefetch from the first processor core, whether the request for prefetch is to be reserved;
registering, by the prefetch unit, when it is judged that the request for prefetch is to be reserved, the request for prefetch in the shared cache management information; and
instructing, by the prefetch unit, when it is not judged that the request for prefetch is to be reserved, the shared cache to request the prefetch,
wherein the shared cache includes:
a data storage area in which the data on the main memory and the number of processor cores are stored for each of the predetermined units of data storage that correspond to the first address; and a shared cache control unit that reads the data from the first address on the main memory and stores the data of the first address on the main memory into the predetermined units of data storage that correspond to the first address based on the request for prefetch sent from the prefetch control unit;

one of the processor cores instructs, upon the load command being executed, the shared cache control unit to read out an address included in the load command;

the shared cache control unit stores the number of processor cores indicated by the request for prefetch in the data storage area in association with the data read from the first address on the main memory; and the shared cache control unit includes:

a readout unit that, when data of the address included in the load command is stored in the data storage area of the shared cache, transfers the data of the address included in the load command to the instructing processor core and reduces the number of processor cores that share the data of the first address in the data storage area; and an updating unit that caches out the data of the first address on the data storage area when the number of processor cores that share the data reaches a predetermined value.

8. The control method for controlling a processor according to claim 7, wherein the step of judging whether the request for prefetch is to be reserved includes:

judging, by the prefetch unit, when the request for prefetch is received from the first processor core, if there is no space in the first area of each predetermined unit of data storage of the shared cache management information, that the request for prefetch is to be reserved in the second area of the shared cache management information; and judging, by the prefetch unit, if there is a space in the first area of each predetermined unit of data storage of the shared cache management information, that the prefetch unit is to instruct the shared cache to request the prefetch.

9. The control method for controlling a processor according to claim 7, further comprising the steps of:

notifying, by the shared cache, when the cache-out is performed, the prefetch unit of the predetermined units of data storage cached out; and updating, by the prefetch unit, shared cache management information corresponding to the predetermined units of data storage notified with the request for prefetch reserved, and instructing the shared cache to perform the request for prefetch.

10. The control method for controlling a processor according to claim 7, wherein the number processor cores is a quantity indicating a number of processor cores that read the data in one of the first arithmetic unit and the second arithmetic unit.

11. The control method for controlling a processor according to claim 7, wherein:

the prefetch command includes: a flag for permitting the number of processor cores to share the data; and the control method further comprises the steps of:

storing, by the shared cache, the flag included in the request for prefetch instructed by the prefetch control unit in the data storage area in association with the data read; and reducing, by the shared cache, upon the flag being a predetermined value, the number of processor cores corresponding to the data in the data storage area.

12. The control method for controlling a processor according to claim 7 , wherein:

the prefetch command includes: a second address at an end on the main memory in a predetermined unit of data storage that is read upon storage of the data in the data storage area of the shared cache; and the control method further comprises the steps of:

storing, by the prefetch unit, the first address and the second address for each predetermined unit of data storage of the shared cache management information; and instructing, by the prefetch unit, upon the request for prefetch being received from the first processor core, the shared cache control unit to update the number of processor cores corresponding to the predetermined units of data storage corresponding to the first address with a number indicating a quantity of processor cores included in the request for prefetch if there is no space in the first area of each predetermined unit of data storage of the shared cache management information and if the second address at the end of the shared cache management information is larger than the first address.

* * * * *